(12) United States Patent
Liao et al.

(10) Patent No.: US 10,676,562 B2
(45) Date of Patent: Jun. 9, 2020

(54) PROCESS FOR PREPARING SOLVENT-FREE AQUEOUS POLYURETHANE DISPERSION

(71) Applicant: NAN YA PLASTICS CORPORATION, Taipei (TW)

(72) Inventors: Te-Chao Liao, Taipei (TW);
Sen-Huang Hsu, Taipei (TW);
Chia-Lung Tsai, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 15/291,138

(22) Filed: Oct. 12, 2016

(65) Prior Publication Data

US 2017/0107319 A1  Apr. 20, 2017

(30) Foreign Application Priority Data

Oct. 19, 2015  (TW) .............................. 104134177 A

(51) Int. Cl.
| | | |
|---|---|---|
| *C08G 18/08* | (2006.01) |
| *C08G 18/10* | (2006.01) |
| *C08G 18/32* | (2006.01) |
| *C08G 18/62* | (2006.01) |
| *C08G 18/75* | (2006.01) |
| *C08G 18/66* | (2006.01) |
| *C08G 18/48* | (2006.01) |
| *C09D 175/04* | (2006.01) |
| *C08F 283/00* | (2006.01) |

(52) U.S. Cl.
CPC ........ *C08G 18/755* (2013.01); *C08F 283/006* (2013.01); *C08G 18/0828* (2013.01); *C08G 18/3206* (2013.01); *C08G 18/4854* (2013.01); *C08G 18/6674* (2013.01); *C09D 175/04* (2013.01)

(58) Field of Classification Search
CPC .............. C08G 18/755; C08G 18/0828; C08G 18/3206; C08G 18/4854; C08G 18/6674; C08G 18/3228; C08G 18/3857; C08G 18/12; C08G 18/0866; C08G 18/10; C08G 18/6225; C08G 18/4654; C08F 283/006; C08F 2220/1808; C08F 220/14; C08F 220/18; C08F 220/20; C09D 175/04
USPC ......................................................... 524/840
See application file for complete search history.

(56) References Cited

FOREIGN PATENT DOCUMENTS

| CN | 102516465 A | * | 6/2012 |
| JP | 10237138 A | * | 9/1998 |

OTHER PUBLICATIONS

JP 10-237138 A, machine translation, JPO Japan Platform for Patent Information (J-PlatPat). (Year: 1998).*
CN 102516465 A, machine translation, Google Patents. (Year: 2012).*

* cited by examiner

*Primary Examiner* — Josephine L Chang
(74) *Attorney, Agent, or Firm* — Li & Cai Intellectual Property (USA) Office

(57) ABSTRACT

A process for preparing solvent-free aqueous polyurethane dispersion modified with acrylic grafting is divided into four steps. The first step is a reaction of a diisocyanate with a polyol to prepare a prepolymer; the second step involves diluting the prepolymer with an acrylate monomer and adding a sulfonate-based chain extender to react; the third step involves adding deionized water and a water-soluble diamine-based chain extender to obtain a solvent-free sulfonate-based aqueous polyurethane dispersion; and the fourth step involves letting the aqueous polyurethane become modified with acrylic grafting. The resulting aqueous polyurethane has excellent mechanical strength, heat resistance and water resistance.

6 Claims, No Drawings

PROCESS FOR PREPARING SOLVENT-FREE AQUEOUS POLYURETHANE DISPERSION

BACKGROUND OF THE INVENTION

1. Field of the Invention

The present invention relates to an aqueous polyurethane dispersion, and more particularly to a process for preparing solvent-free aqueous polyurethane dispersion.

2. Description of Related Art

In recent years, environmental protection has become increasingly prominent, and, regarding how to effectively reduce emission of volatile organic compounds (VOCs) and other pollutants have inevitably become a global trend. Particularly, applications related to aqueous polyurethane and aqueous acrylic are expected to reduce use of solvents, when the solvents if used could be one of prohibited pollutants.

Presently, aqueous polyurethane is synthesized through the known acetone process due to using acetone as a solvent in the course of manufacturing process, in which polyether or polyester polyol reacts with isocyanate so as to synthesize a high-viscosity prepolymer terminated by an NCO functional group, then adding a low-boiling solvent that is compatible to water (such as acetone, butanone or tetrahydrofuran) for dilution and viscosity reduction, afterward adding hydrophilic chain extender for chain extension, and adding water under high shear force for emulsification. As water is added, phase transition increases, so as to form an aqueous polyurethane system in which water becomes a continuous phase. At last, the solvent is distilled, separated and recycled.

One available hydrophilic chain extender for aqueous polyurethane produced from the known acetone process is selected from carboxylates, such as dimethylol propionic acid (DMPA) or dimethylolbutanoic acid (DMBA), and has to work with triethylamine (TEA) as a neutralizer. However, TEA being a toxic compound and having penetrating odor is against the product requirement for low odor.

In view of this issue regarding the acetone process due to using acetone can cause environmental pollution if the acetone is not recycled properly, an alternative approach to mix the prepolymer (hereinafter abbreviated as a prepolymer preparing approach) is addressed, which uses polyurethane (PU) prepolymer having a truncated NCO end for emulsification in the aqueous phase to eliminate the use of huge solvents.

However, in such a known prepolymer preparing approach, the viscosity of the prepolymer takes an important role. If the viscosity is high, dispersion of the prepolymer is difficult and even impossible. Thus, a small amount of solvents is usually used to reduce the viscosity. In addition, since water can react with isocyanate, so that the process of dispersion shall not last long, a chain extender has to be added at the earliest possibility, and the consumption of isocyanate will be too high; otherwise, an alternative is to use isocyanate that is less reactive. Therefore, the aqueous polyurethane (PU) made using this known prepolymer preparing approach is usually qualitatively poor than that made using the aforesaid acetone process.

Consequently, the known acetone process for preparing aqueous polyurethane provides good reproducibility of synthesis, but in course of manufacturing process the prepolymer is highly viscous and poorly dispersed, and the solvents can only be added when the reactant has been cooled, otherwise there may be a bumping.

Accordingly, the acetone process has disadvantages including use of huge acetone solvents, pollution to the environment when acetone solvents not distilled and recycled properly, needs for making an investment in acetone distilling and recycling facilities, and excessive residual of distilled solvents that prevents the solvents from being real water-borne as desired.

The prepolymer preparing approach can only use less reactive isocyanate, since the viscosity of aqueous polyurethane if prepared by the approach is limited to the dispersion of the prepolymer, so that the final PU product prepared by the approach is qualitatively inferior to the final PU product prepared by the aforesaid acetone process.

SUMMARY OF THE INVENTION

For solving those above-mentioned drawbacks derived from either the known acetone process or the known prepolymer preparing approach for preparing aqueous polyurethane, the present invention teaches to use a grafted and modified acrylic as a solvent to successfully improve the final produced polyurethane product in terms of mechanical strength, heat resistance and water resistance.

Hence, a primary objective of the present invention is to use an acrylate monomer instead of acetone to dilute prepared polyurethane prepolymers, resulted in that the acrylate monomer can be added without the need of cooling the reactant, and the prepared prepolymer is well dispersed and favorable to subsequent dispersion in water, while coagulation and acetone residual can be prevented.

In particular, when three acrylate monomers including 2-hydroxyethyl acrylate (2-HEA), methyl methacrylate (MMA) and ethyl acrylate (EA) are used in combination and if added after the reaction of the prepolymer performs for 2-3 hours, some complementary and synergistic effects of the prepolymer can be obtained for excellent physical properties, dissolution and dispersion, it is because, among the three monomers, 2-hydroxyethyl acrylate (2-HEA) contains hydroxyl groups (—OH) that react with isocyanate, while methyl methacrylate (MMA) and ethyl acrylate (EA) contributes to increased molecular weight of acrylic, thereby compensating the defects of polyurethane such as low heat resistance and low mechanical strength and accomplishing good physical properties while acting as solvents.

In addition, an alternative hydrophilic chain extender is selected from sulfonates such as sodium 2-[(2-aminoethyl)amino]ethanesulphonate (AAS) and sodium 3,5-diaminobenzenesulfonate (DABS). Such a hydrophilic chain extender is more hydrophilic than carboxylate, and has stronger ionization, so can be used in a reduced amount. Moreover, since sulfonate is electrically neutral, highly stable aqueous polyurethane can be prepared without adding amines for neutralization.

The present invention discloses such an aqueous polyurethane dispersion having the polyurethane grafted with and modified by acrylic, so that the polyurethane presents some specific features such as containing acrylic grafting for modification, as well as containing of which main chain of the polyurethane has groups formed by polyisocyanates, polyols and non-ionic groups, and of which side chain further has both sulfo-based anionic groups and sulfo-based non-ionic groups.

According to the present invention, the aqueous polyurethane dispersion is synthesized using acrylic for grafting and modification through the following steps:

1) Preparation of prepolymers:

Weighing 15-25 wt % of a polyol based on a total amount of reacting materials that include deionized water (similarly hereinafter), dehydrating the polyol in vacuum, placing the polyol into a reactor that is equipped with a stirrer, a thermometer and a condenser, and adding 5-12 wt % of diisocyanate when oil bath has its temperature raising to 70-80° C. for synthesis;

2) Dilution and chain extension of the prepolymer:

Allowing the prepolymer to react for 2-3 hours, adding 10-30 wt % of an acrylate monomer for dilution and viscosity reduction, holding the reactant at 85-90° C. until an NCO content reach a theoretical value of NCO % (determined by the di-n-butylamine method), adding 1.5-3.0 wt % of a sulfonate-based chain extender, which is preferably sodium 2-[(2-aminoethyl) amino]ethanesulphonate (AAS), and allowing the reactant to react for 25-40 minutes more;

3) Dispersion in water:

Cooling the polymer obtained from Step 2) to room temperature, adding 35-55 wt % of deionized water at high shear force caused by an agitator under a rotation rate of 500 rpm, and adding 0.1-0.5 wt % of a chain extender to perform chain extension for about 30 minutes, so as to obtain the solvent-free sulfonate-based aqueous polyurethane dispersion; and 4) Synthesis of acrylic:

Adding 0.3-1.0 wt % of an emulsifier to the dispersion of the preceding step so as to form emulsion, stirring and heating the emulsion to 50-70° C., dropwise adding 0.01-0.10 wt % of the initiator, then heating to 75-85° C. and held the temperature for 1-3 hours, cooling the reactant to 50-70° C., and adding 0.01-0.08 wt % of a reducer, thereby obtaining an aqueous polyurethane grafted with and modified by the acrylic.

The aforesaid theoretical value of NCO % (hereinafter referred to as theoretical NCO % value) for a polyurethane (PU) is meant that the weight percentage of anionic groups remaining after isocyanato (—NCO) of polyisocyanate and hydroxyl (—OH) of the polyol react completely, based on the total weight of all the participating reacting substances. In other words, the theoretical NCO % value is 0.5-10%. In contrast, the term of reaction NCO % content if presented in the following Examples is meant that the NCO % content obtained using dibutylamine titration during the reaction, namely in the preparing step of adding water and before emulsification.

When the reaction NCO % content of the polyurethane resin ranges 50-85% of the theoretical NCO % value, the polyurethane resin is stably dispersed in and formed as an aqueous polyurethane dispersion without coagulation.

However, during synthesis of polyurethane, if excessive reaction consumes polyisocyanate to the extent that the reaction NCO % content of the polyurethane resin becomes below 50% of the theoretical NCO % value, polyurethane will excessively react and this can lead to undesirably high crosslinking in the net structure of polyurethane, thereby causing polyurethane to have too much coagulation in the aqueous phase and become failed. On the contrary, in the event that the reaction NCO % content is higher than 85% of the theoretical NCO % value, the synthesized polyurethane will lack of net structure, and the thin film made from aqueous polyurethane will be too sticky at its surface, meaning that the thin film is tend to mutual adhesion and become unusable.

Since the process for preparing solvent-free aqueous polyurethane dispersion of the present invention is no need to use acetone considerably, the synthesis output can be increased significantly and the manufacturing costs can be reduced effectively.

DETAILED DESCRIPTION OF THE INVENTION

For preparing aqueous polyurethane, the present invention adopts a four-stage polymerization process as well as uses a specific acrylate monomer instead of acetone to dilute a polyurethane prepolymer, which process is favorable to synthesize a kind of solvent-free aqueous polyurethane whose chemical structure has been grafted with and modified by acrylic (hereinafter referred to as modified by acrylic grafting).

More detailed speaking, the present invention discloses a process for preparing solvent-free aqueous polyurethane dispersion modified by acrylic grafting, of which process comprises the following four-stage polymerization process:

1. Preparation of Prepolymers:

In this stage, a polyol and a diisocyanate undergo urethane reaction to synthesize a prepolymer. Preferably, the prepolymer has a theoretical equivalence ratio of (NCO/OH) ranging between 1.1 and 2.3.

Therein, the polyol is at least one selected from the group consisting of polyester polyol, polyether polyol, polycarbonate polyol and polyester amide polyol.

The diisocyanate is selected from the group consisting of aliphatic diisocyanate, alicyclic diisocyanate and modifications thereof, which can be used along or have two or more combined in use.

The polyester polyol is made through condensation reaction between a low molecular weight diol and a dicarboxylic acid. Therein, the diol is selected from the group consisting of ethylene glycol, 1,3-propanediol and 1,4-butylene glycol. The dicarboxylic acid is selected from the group consisting of succinic acid, glutaric acid, adipic acid, heptanedioic acid, suberic acid, azelaic acid, sebacic acid, decane dicarboxylic acid and cyclohexane dicarboxylic acid.

The polyester amide polyol is an amide-based polyester amide polyol, and is selected from the group consisting of hexamethylene diamine and isophorone diamine.

These polyols may be used alone or in any combinations, and their copolymers are also usable.

The polyether polyol is selected from the group consisting of poly(tetramethylene ether) glycol (PTMG), polypropanediol (PPG) and polyether polyols whose main chain and side chain are poly ethylene glycol (PEG).

The aliphatic diisocyanate is selected from the group consisting of tetramethylene diisocyanate, hexamethylene diisocyanate, decamethylene diisocyanate(decamethylene diisocyanate) and lysine diisocyanate, and is preferably hexamethylene diisocyanate.

The alicyclic diisocyanate is selected from the group consisting of isophorone diisocyanate, hydrogenated tolylene diisocyanate, hydrogenated xylene diisocyanate, hydrogenated diphenylmethane diisocyanate and tetramethylxylene diisocyanate, and is preferably isophorone diisocyanate.

The urethane modification of the aliphatic diisocyanate or alicyclic diisocyanate is selected from the group consisting of carbodiimide modification, allophanate modification, urea modification, biuret modification, uretodion modification, uretonimine modification and isocyanurate modification.

The diisocyanate may be replaced with aromatic polyisocyanate or aromatic diisocyanate. Therein, aromatic polyisocyanate is selected from the group consisting of polyphenylene polymethylene polyisocyanate and crude tolylene diisocyanate.

The aromatic diisocyanate is selected from the group consisting of 2,4-toluene diisocyanate, 2,6-toluene diisocyanate, xylene-1,4-diisocyanate, xylene-1,3-diisocyanate, 4,4'-diphenylmethane diisocyanate, 2,4'-diphenylmethane diisocyanate, 4,4'-diphenyl ether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropanediisocyanate, m-phenyl diisocyanate, p-phenyl diisocyanate, naphthalene-1,4-diisocyanate, naphthalene-1,5-diisocyanate and 3,3'-dimethoxydiphenyl-4,4'-diisocyanate.

The present invention may use a low molecular weight polyol and diisocyanate to perform urethane reaction. Therein, the low molecular weight polyol is selected from the group consisting of ethylene glycol, 1,3-propanediol, 1,2-propanediol, 1,2-butylene glycol, 1,3-butylene glycol, 1,4-butylene glycol, 1,5-pentadiol, 1,6-hexanediol, 3-methyl-1,5-pentadiol, neopentadiol, 1,8-ethohexadiol, 1,9-nonanediol, 3,3-dihydroxymethylheptane, diglycol, 1,4-cyclohexanediol, 1,4-cyclohexanedimethanol, 2-ethyl-1,3-propanediol, 2-n-propyl-1,3-propanediol, 2-isopropyl-1,3-propanediol, 2-n-butyl-1,3-propanediol, 2-isobutyl-1,3-propanediol, 2-tert-butyl-1,3-propanediol, 2-methyl-2-ethyl-1,3-propanediol, 2,2-diethyl-1,3-propanediol, 2-ethyl-2-n-propyl-1,3-propanediol, 2-ethyl-2-n-butyl-1,3-propanediol, 2-ethyl-3-ethyl-1,4-butylene glycol, 2-methyl-3-ethyl-1,4-butylene glycol, 2,3-diethyl-1,5-pentadiol, 2,4-diethyl-1,5-pentadiol and 2,3,4-triethyl-1,5-pentadiol; or is selected from the group consisting of trimethylolpropane, dimethylol propionic acid, dimethylol butanoic acid, diacid diol, glycerol, pentaerythritol and alkylene oxide adducts of bisphenol A.

2. Dilution and Chain Extension of the Prepolymer:

The acrylate monomer may be one or more acrylate-based monomers selected from the group consisting of methyl acrylate, methyl methacrylate (MMA), ethyl acrylate (EA), isooctyl acrylate, butyl acrylate, methylbutyl acrylate, ethylhexyl acrylate and 2-hydroxyethyl acrylate (2-HEA) and may alternatively be monomethyl maleate, methylhydrogen itaconate, monomethyl fumarate, styrene and mixtures thereof instead of the acrylate-base monomers.

Preferably, three acrylate monomers are used together, namely 2-hydroxyethyl acrylate (2-HEA), methyl methacrylate (MMA) and ethyl acrylate (EA) for complementary and synergistic effects, and also act as solvents.

Therein, 2-hydroxyethyl acrylate (2-HEA) contains hydroxyl groups (—OH) that react with isocyanate, while methyl methacrylate (MMA) and ethyl acrylate (EA) contributes to increased molecular weight of acrylic, thereby compensating the defects of polyurethane such as low heat resistance and low mechanical strength and accomplishing good physical properties while acting as solvents. Moreover, since there is no need to use acetone considerably, the synthesis output can be increased significantly and the manufacturing costs can be reduced effectively. The proportions of the three acrylate monomers, based on the total weight of the acrylate monomers, are:

(a) 85-95 wt % methyl methacrylate (MMA);
(b) 4-9 wt % 2-hydroxyethyl acrylate (2-HEA); and
(c) 2-6 wt % ethyl acrylate (EA).

The particularly preferable combination is 92 wt % of methyl methacrylate (MMA), 5 wt % of 2-hydroxyethyl acrylate (2-HEA) and 3% of ethyl acrylate (EA).

For achieving chain extension of the prepolymer, the present invention uses a sulfonate as a hydrophilic chain extender, added in an amount of 80-90% of NCO/OH equivalence ratio. The sulfonate acts as not only a hydrophile for polyurethane, but also a high molecular weight emulsifier, and is selected from the group consisting of sodium 2,4-benzenesulfonate, sodium 2-[(2-aminoethyl)amino]ethanesulphonate (AAS), sodium 3,5-diaminobenzenesulfonate (DABS), sodium 1,4-butylene glycol-2-sulfonate, sodium 1,2-dihydroxyl-3-propanesulfonate and sodium N,N-dihydroxyethylaminoethylsulfonate, wherein AAS or DABS is preferable.

3. Dispersion in Water:

After dispersion in water, a water-soluble diamine-based chain extender is further weighted and added for chain extension. The diamine-based chain extender is selected from the group consisting of low molecular weight polyamines having a (number average) molecular weight below 500, including ethylenediamine, hexamethylenediamine, xylenediamine, isophoronediamine, diethylenetriamine and N-amino ethyl-N-ethanolamine.

4. Synthesis of the Acrylic:

This stage involves adding 0.3-1.0 wt % of an emulsifier based on the total amount of the reacting materials to the dispersion of Step 3) so as to form emulsion, stirring and heating the emulsion to 50-70° C., dropwise adding 0.01-0.10 wt % of an initiator for polymerization of the acrylic, then heating to 75-85° C. and holding the temperature for 1-3 hours, cooling the reactant to 50-70° C., and adding 0.01-0.08 wt % of a reducer, thereby a solvent-free aqueous polyurethane dispersion modified by acrylic grafting is finally obtained.

The emulsifier added at stage of synthesis of the acrylic is a surfactant and can significantly reduce surface tension, thereby making oil and water that are originally insoluble to each other can be mixed into stable and less likely separating white emulsion under stirring, so is a requisite for polymerization of emulsion. The emulsifier may be one more anionic, non-ionic and reactive emulsifiers.

The anionic emulsifier is selected from the group consisting of sodium lauryl sulfate (SLS), sodium dodecyl benzene sulfonate, potassium stearate, sodium dioctyl sulfosuccinate, sodium dodecyldiphenyloxy disulfonate, sodium styrene sulfonate, nonylphenoxy poly ethyl (1) ethoxyethyl sulfate ammonium, sodium dodecyl allyl sulfosuccinate, linseed oil fatty acid, ethoxylated nonylphenol phosphate sodium, ethoxylated nonylphenol phosphate ammonium, sodium octoxynol-3-sulfate, sodium cocoyl sarcosinate, 1-alkoxy-2-sodium hydroxypropyl sulfonate, sodium alpha-olefin (C14-C16) sulfonate, sulfate of hydroxyl anol, N-(1,2-dicarboxyethyl)-N-octadecylsulfonylsuccinamate tetrasodium, N-octadecylsulfonylsuccinamyldisodium, alkylamidepolyethoxy sulfonylsuccinic acid disodium, disodium ethoxylated nonylphenol sulfonylsuccinate and sodium ethoxyethyl sulfate. The emulsifier is used in an amount below 3 wt % based on the weight of the acrylate monomer, i.e., used in an amount of 0.3-1.0 wt % based on the total amount of reacting materials.

The non-ionic or reactive emulsifier includes poly-tert-octylphenoxyethyl (39) eyhoxyethanol, dodecyloxy poly (10) ethoxyethanol, nonylphenoxyethyl-poly (40) eyhoxyethanol, polyethylene glycol 2000 monooleate, ethoxylated castor oil, fluorinated alkyl esters and alkoxylates, polyoxyethylene (20) sorbitan alcohols monolaurate, sucrose monococoae, di(2-butyl) phenoxy poly (20) ethoxyethanol and hydroxyethylcellulose polybutyl acrylate graft copolymer.

The initiator is preferably a water-soluble free-radical initiator, which is selected from the group consisting of hydrogen peroxides, tertiarybutyl peroxides and alkali metal persulfates; or is selected from the group consisting of sodium persulfate, potassium persulfate, lithium persulfate and ammonium persulfate (APS). The initiator is used in an amount of 0.01-3.0 wt % based on the total amount of the acrylate monomer, i.e., used in an amount of 0.01-0.10 wt % based on the total amount of reacting materials.

At the last stage of polymerization of the emulsion, for preventing high heat that causes condensation, a reducer may be used at 50-70° C. for post-elimination of the monomer to minimize residual of the monomer.

The reducer is selected from sulfites such as alkali metal metabisulfites, hydrogen sulfites and hydrosulfites; sodium formaldehyde sulfoxylate (SFS); tert-butyl hydroperoxide (TBHP) or reducing sugars such as ascorbic acid and erythorbic acid. Therein, sodium formaldehyde sulfoxylate (SFS) is suitable for post-elimination of methyl methacrylate and 2-hydroxyethyl acrylate, and tert-butyl hydroperoxide (TBHP) is suitable for post-elimination of ethyl acrylate and butyl acrylate. The reducer is used in an amount of 0.1-0.3 wt % based on the total amount of the acrylate monomer, i.e., used in an amount of 0.01-0.08 wt % based on the total amount of the reacting materials.

A specific process for preparing solvent-free aqueous polyurethane dispersion modified by acrylic grafting according to the invention comprises the following steps:

1) Preparation of prepolymers:
Weighing 15-25 wt % of a polyol based on a total amount of reacting materials that include deionized water (similarly hereinafter), dehydrating the polyol in vacuum, placing the polyol into a reactor that is equipped with a stirrer, a thermometer and a condenser, and adding 5-12 wt % of diisocyanate when oil bath has its temperature raising to 70-80° C. for synthesis;

2) Dilution and chain extension of the prepolymer:
Allowing the prepolymer to react for 2-3 hours, adding 10-30 wt % of an acrylate monomer for dilution and viscosity reduction, holding the reactant at 85-90° C. until an NCO content reach the theoretical NCO % value (determined by the di-n-butylamine method), adding 1.5-3.0 wt % of a sulfonate-based chain extender, which is preferably sodium 2-[(2-aminoethyl) amino]ethanesulphonate (AAS), and allowing the reactant to react for 25-40 minutes more;

3) Dispersion in water:
Cooling the polymer obtained from Step 2) to room temperature, adding 35-55 wt % of deionized water at high shear force caused by an agitator under a rotation rate of 500 rpm, and adding 0.1-0.5 wt % of a water-soluble diamine-based chain extender to perform chain extension for about 30 minutes, so as to obtain a solvent-free sulfonate-based aqueous polyurethane dispersion; and 4) Synthesis of acrylic:
Adding 0.3-1.0 wt % of an emulsifier to the dispersion of the preceding step so as to form emulsion, stirring and heating the emulsion to 50-70° C., dropwise adding 0.01-0.10 wt % of the initiator, then heating to 75-85° C. and held the temperature for 1-3 hours, cooling the reactant to 50-70° C., and adding 0.01-0.08 wt % of a reducer, thereby obtaining a solvent-free aqueous polyurethane dispersion modified by acrylic grafting.

The following description is made with reference to some Examples and Comparative Example for further illustrating how the process of the present invention prepares a solvent-free aqueous polyurethane dispersion modified by acrylic grafting, while the scope of the present invention is not limited thereto.

Example 1

The present embodiment is formed by mixing aqueous polyurethane as Resin A and polyacrylate emulsion as Resin B.

1. Preparing Aqueous Polyurethane (Resin A):
First, 98.8 g of PTMG2000 (polyether diol, molecular weight 2000), and 6.44 g of 1,4-BG (1,4-butylene glycol, molecular weight 90) are successively added in to a reactor. The mixture is heated to 80° C. while stirred at a uniform speed. Afterward, 43.5 g of isophorone diisocyanate is added. The mixture is heated to 85-90° C. and held at this temperature for 2-3 hours to allow reaction. At this time, 147.2 g of methyl methacrylate (MMA), 8 g of 2-hydroxyethyl acrylate (2-HEA), 4.8 g of ethyl acrylate (EA) are added in batch to dilute and reduce viscosity the prepolymer.

The prepolymer is then added with 10.7 g of sodium 2-[(2-aminoethyl) amino]ethanesulphonate (AAS) and reacts for 25-40 minutes more. After cooled to room temperature, the prepolymer is stirred at stirring speed of 500 rpm while 236.3 g of deionized water is added thereto. Then 0.95 g of ethylenediamine is added for chain extension about 30 minutes, so as to obtain a solvent-free sulfonate-based aqueous polyurethane emulsion.

2. Preparing Polyacrylate Emulsion (Resin B):
First, 4.8 g of sodium lauryl sulfate (SLS) is added to the foregoing sulfonate-based aqueous polyurethane emulsion under high-speed stirring. The mixture is heated to 50-70° C., and 0.40 g of ammonium persulfate aqueous solution (APS) is dropwise added. The mixture is heated to 75-85° C., and the temperature is held for 1-3 hours. After cooled to 50-70° C., the mixture is added with 0.15 g of tert-butyl hydroperoxide aqueous solution (TBHP) and 0.16 g of sodium formaldehyde sulfoxylate (SFS) as reducers, for reaction for 30 minutes, so as to obtain a solvent-free aqueous polyurethane dispersion modified by acrylic grafting. The solid portions therein are Resin A and Resin B, at a ratio of 1:1.

Example 2

Similar to Example 1, the present embodiment uses aqueous polyurethane as Resin A and polyacrylate emulsion as Resin B. Wherein Resin A is used at a greater proportion. The process is as below.

1. Preparing Aqueous Polyurethane (Resin A):
First, 197.6 g of PTMG2000 (polyether diol, molecular weight 2000), and 12.9 g of 1,4-BG (1,4-butylene glycol, molecular weight 90) are successively added into a reactor. The mixture is heated to 80° C. while stirred at a uniform speed. Afterward, 87 g of isophorone diisocyanate is added. The mixture is heated to 85-90° C. and held at this temperature for reaction for 2-3 hours. At this time, 147.2 g of methyl methacrylate (MMA), 8 g of 2-hydroxyethyl acrylate (2-HEA), and 4.8 g of ethyl acrylate (EA) can be added in batch for dilution and viscosity reduction.

The prepolymer is added with 21.4 g of sodium 2-[(2-aminoethyl) amino]ethanesulphonate (AAS) for continuous reaction for 25-40 minutes more. After cooled to room temperature, the prepolymer is stirred at stirring speed of 500 rpm while 472.6 g of deionized water is added. Then 1.9 g of ethylenediamine is added for chain extension about 30 minutes, so as to obtain a solvent-free sulfonate-based aqueous polyurethane emulsion.

2. Preparing Polyacrylate Emulsion Resin B):

First, 4.8 g sodium lauryl sulfate (SLS) is added to the foregoing sulfonate-based aqueous polyurethane emulsion under high-speed stirring. The mixture is heated to 50-70° C., and 0.40 g of ammonium persulfate aqueous solution (APS) is dropwise added. The mixture is heated to 75-85° C., and the temperature is held for 1-3 hours. After cooled to 50-70° C., the mixture is added with 0.15 g of tert-butyl hydroperoxide aqueous solution (TBHP) and 0.16 g of sodium formaldehyde sulfoxylate (SFS) as reducers for reaction for 30 minutes, so as to obtain a solvent-free aqueous polyurethane dispersion modified by acrylic grafting. The solid portions therein are Resin A and Resin B, at a ratio of 2:1.

Example 3

Similar to Embodiment 1, the present embodiment uses aqueous polyurethane as Resin A and polyacrylate emulsion as Resin B. Wherein Resin A is used at a greater proportion. The process is as below.

1. Preparing Aqueous Polyurethane Resin A):

First, 296.4 g of PTMG2000 (polyether diol, molecular weight 2000) and 19.3 g of 1,4-BG (1,4-butylene glycol, molecular weight 90) are successively added into a reactor. The mixture is mixed at uniform speed while being heated to 80° C. Then 130.5 g of isophorone diisocyanate is added. The temperature is raised to 85-90° C. and held to allow reaction for 2-3 hours. At this time, 147.2 g of methyl methacrylate (MMA), 8 g of 2-hydroxyethyl acrylate (2-HEA), 4.8 g of ethyl acrylate (EA) may be added in batch for dilution and viscosity reduction.

The prepolymer is added with 32.1 g of sodium 2-[(2-aminoethyl) amino]ethanesulphonate (AAS), and the reaction performs for 25-40 minutes more. Afterward, the mixture is cooled to room temperature. The prepolymer is stirred at 500 rpm while 708.9 g of deionized water is added. Then 2.9 g of ethylenediamine is added for chain extension about 30 minutes, so as to obtain solvent-free sulfonate-based aqueous polyurethane emulsion.

Preparing Polyacrylate Emulsion (Resin B):

First, 4.8 g of sodium lauryl sulfate (SLS) is added to the foregoing sulfonate-based aqueous polyurethane emulsion under high-speed stirring. The mixture is heated to 50-70° C., and 0.40 g of ammonium persulfate aqueous solution (APS) is dropwise added. The mixture is heated to 75-85° C., and the temperature is held for 1-3 hours. After cooled to 50-70° C., the mixture is added with 0.15 g of tert-butyl hydroperoxide aqueous solution (TBHP) and 0.16 g of sodium formaldehyde sulfoxylate (SFS) as reducers for reaction for 30 minutes, so as to obtain a solvent-free aqueous polyurethane dispersion modified by acrylic grafting. The solid portions therein are Resin A and Resin B, at a ratio of 3:1.

Comparative Example 1

The present comparative example uses aqueous polyurethane as Resin A, and uses the known acetone process for synthesis, without mixing polyacrylate emulsion. The process is as below.

First, 75 g of PTMG2000 (polyether diol, molecular weight 2000) and 7.3 g of 1,4-BG (1,4-butylene glycol, molecular weight 90) are successively added into a reactor, the mixture is heated to 80° C. while stirred at a uniform speed. Then 58.8 g of isophorone diisocyanate is added. The mixture is heated to 85-90° C., and held at this temperature for reaction for 2-3 hours. After cooled to 30-50° C., 160 g of acetone is added for dilution and viscosity reduction. After 20 minutes, 17.5 g of sodium 2-[(2-aminoethyl) amino]ethanesulphonate (AAS) is added for continuous reaction for 25-40 minutes more. After cooled to room temperature, the mixture is stirred at 500 rpm while 266.6 g of deionized water is added. Then 1.1 g of ethylenediamine is added for chain extension about 30 minutes. Afterward, acetone is distilled so as to obtain acrylic-free sulfonate-based aqueous polyurethane emulsion.

Results:

1. The four versions of aqueous polyurethane made using the methods described in Examples 1-3 and Comparative Example 1 are processed into thin film for receiving tests on physical properties, and the results are shown in Table 1.

TABLE 1

Compositions and Physical Properties of Prepared Film

| | | Example 1 | Example 2 | Example 3 | Comparative Example 1 |
|---|---|---|---|---|---|
| Test Results | Tensile Strength (kg/cm$^2$) | 351 | 308 | 276 | 231 |
| | Elongation at Break (%) | 324 | 377 | 411 | 464 |
| | Heat-Resistant Adhesion (70° C. *3 Kg*24 hours) | No Sticking | No Sticking | Slight Sticking | Serious Sticking |
| | Hydrolysis Resistance (10% NaOH*8 hours) | No Chapping | No Chapping | Slight Chapping | Serious Chapping |
| | Weather Resistance (70° C. *95% RH) | Normal for 14 Weeks | Normal for 10 Weeks | Normal for 8 Weeks | Normal for 5 Weeks |
| | Acetone Content (ppm) | None | None | None | 1572 |

2. According to the test results shown in Table 1, the versions of aqueous polyurethane of Examples 1-3 of the present invention that are grafted with and modified by acrylic have their solid portions increasing with the proportion of acrylic, while accordingly their tensile strength of the resultant increases, elongation at break decreases, and heat-resistant adhesion as well as hydrolysis resistance increase. The results indicate that the disclosed solvent-free aqueous polyurethane dispersion modified by acrylic grafting of the present invention improves the unmodified aqueous polyurethane in terms of mechanical strength, heat resistance and hydrolysis resistance, and eliminates the problem related to acetone residual, thereby meeting the requirement for being water-borne.

What is claimed is:

1. A process for preparing solvent-free aqueous polyurethane dispersion, which uses acrylic instead of acetone to obtain a solvent-free aqueous polyurethane dispersion modified by acrylic grafting, comprising the following steps in specific order from 1) to 4):
   1) based on a total amount of reacting materials including deionized water, reacting 15-25 wt % of a polyol and 5-12 wt % of diisocyanate for 2-3 hours under a temperature of 70-80° C. to obtain a prepolymer;
   2) holding the temperature at 85-90° C., diluting the prepolymer without acetone by adding 10-30 wt % of an acrylate monomer for viscosity reduction until reaching a theoretical NCO % value; and adding 1.5-3.0 wt % of a sulfonate-based chain extender to react for an additional 25-40 minutes,
   3) cooling the prepolymer obtained from Step 2) to room temperature, adding 35-55 wt % of deionized water and 0.1-0.5 wt % of a water-soluble diamine-based chain extender to perform chain extension without acetone for about 30 minutes to obtain a solvent-free sulfonate-based aqueous polyurethane dispersion; and
   4) adding 0.3-1.0 wt % of an emulsifier to the dispersion of Step 3) to form an emulsion without acetone, heating to 50-70° C., dropwise adding 0.01-0.10 wt % of an initiator, then heating to 75-85° C. and holding the temperature for 1-3 hours, cooling to 50-70° C., and adding 0.01-0.08 wt % of a reducer, thereby obtaining a solvent-free aqueous polyurethane dispersion modified with acrylic grafting;
   wherein the acrylate monomer based on the total weight of 10-30 wt % added in Step 2) is composed of
   (a) 85-95 wt % of methyl methacrylate;
   (b) 4-9 wt % of 2-hydroxyethyl acrylate; and
   (c) 2-6 wt % of ethyl acrylate.

2. The process of claim 1, wherein the polyol used in Step 1) is polyether polyols.

3. The process of claim 1, wherein the sulfonate-based chain extender added in Step 2) is sodium 2-[(2-aminoethyl)amino]ethanesulphonate (AAS).

4. The process of claim 2, wherein the acrylate monomer based on the total weight of 10-30 wt % added in Step 2) is composed of
   (a) 92 wt % of methyl methacrylate;
   (b) 5 wt % of 2-hydroxyethyl acrylate; and
   (c) 3 wt % of ethyl acrylate.

5. The process of claim 1, wherein the diamine-based chain extender added in Step 3) is an ethylenediamine having a number average molecular weight below 500.

6. The process of claim 1, wherein the initiator added in Step 4) is an ammonium persulfate (APS).

* * * * *